(12) United States Patent
Theiss et al.

(10) Patent No.: US 8,943,905 B2
(45) Date of Patent: Feb. 3, 2015

(54) TORSION MEASUREMENT DEVICE

(76) Inventors: David H. Theiss, Houston, TX (US); Brian D. Bibighaus, Houston, TX (US)

(*) Notice: Subject to any disclaimer, the term of this patent is extended or adjusted under 35 U.S.C. 154(b) by 316 days.

(21) Appl. No.: 13/426,863

(22) Filed: Mar. 22, 2012

(65) Prior Publication Data

US 2013/0247681 A1 Sep. 26, 2013

(51) Int. Cl.
*G01L 1/24* (2006.01)
*G01L 3/00* (2006.01)
*G01L 3/14* (2006.01)

(52) U.S. Cl.
USPC ............... 73/862.321; 73/800; 73/862.324

(58) Field of Classification Search
CPC ........ G01L 3/12; G01L 5/0042; G01B 11/16; G01B 11/18; G01M 11/085; G01M 5/0025
USPC .............................. 73/800, 862.331–862.335, 73/862.322–862.325
See application file for complete search history.

(56) References Cited

U.S. PATENT DOCUMENTS

| | | | |
|---|---|---|---|
| 4,281,537 A * | 8/1981 | Burbank, III | 73/862.331 |
| 5,152,182 A * | 10/1992 | Searle | 73/862.23 |
| 7,222,541 B2 * | 5/2007 | Lohr et al. | 73/847 |
| 2009/0266178 A1 | 10/2009 | Matzoll, Jr. et al. | |
| 2011/0259115 A1 * | 10/2011 | Roberts et al. | 73/800 |

FOREIGN PATENT DOCUMENTS

| | | |
|---|---|---|
| WO | 99/05493 A1 | 2/1999 |
| WO | 2010/010384 A1 | 1/2010 |

OTHER PUBLICATIONS

Copenheaver, PCT International Search Report and Written Opinion for PCT/US2013/033064, Jun. 5, 2013.

* cited by examiner

*Primary Examiner* — Lisa Caputo
*Assistant Examiner* — Jonathan Dunlap
(74) *Attorney, Agent, or Firm* — Eubanks PLLC

(57) ABSTRACT

A torsion measurement device is disclosed. In one embodiment, the device includes a component having a marked surface and an optical sensor. The marked component and the optical sensor may be attached to a tube or other elongate member and positioned to enable the optical sensor to measure angular deflection of the tube from rotation of the marked component with respect to the optical sensor. The angular deflection may be combined with other data to determine applied torque and torsional stress on the tube or other elongate member. Additional systems, devices, and methods are also disclosed.

17 Claims, 5 Drawing Sheets

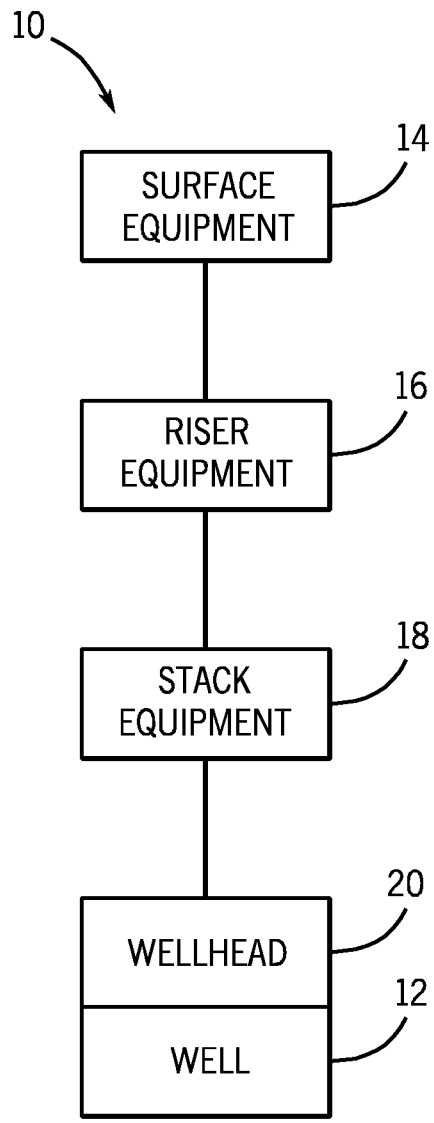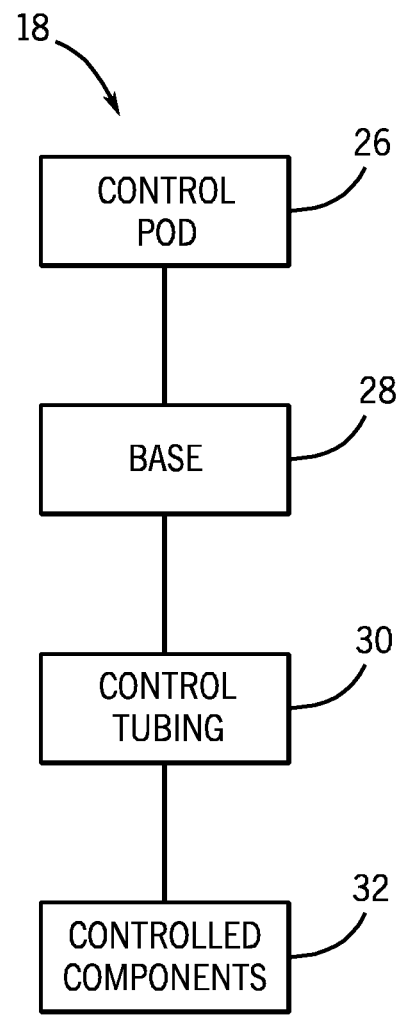
FIG. 1
FIG. 2

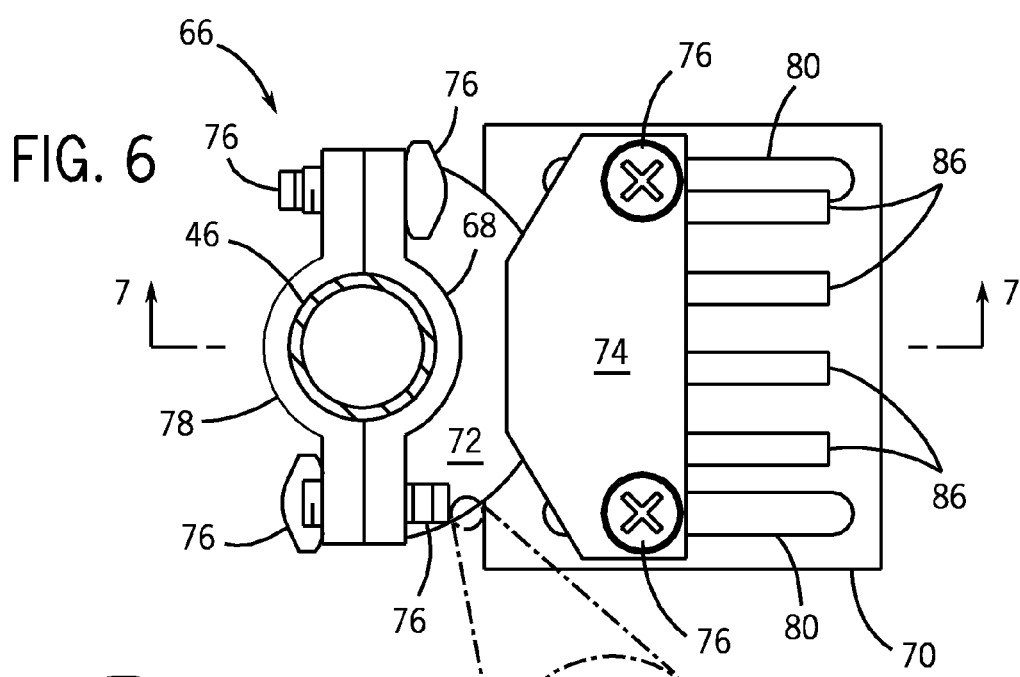
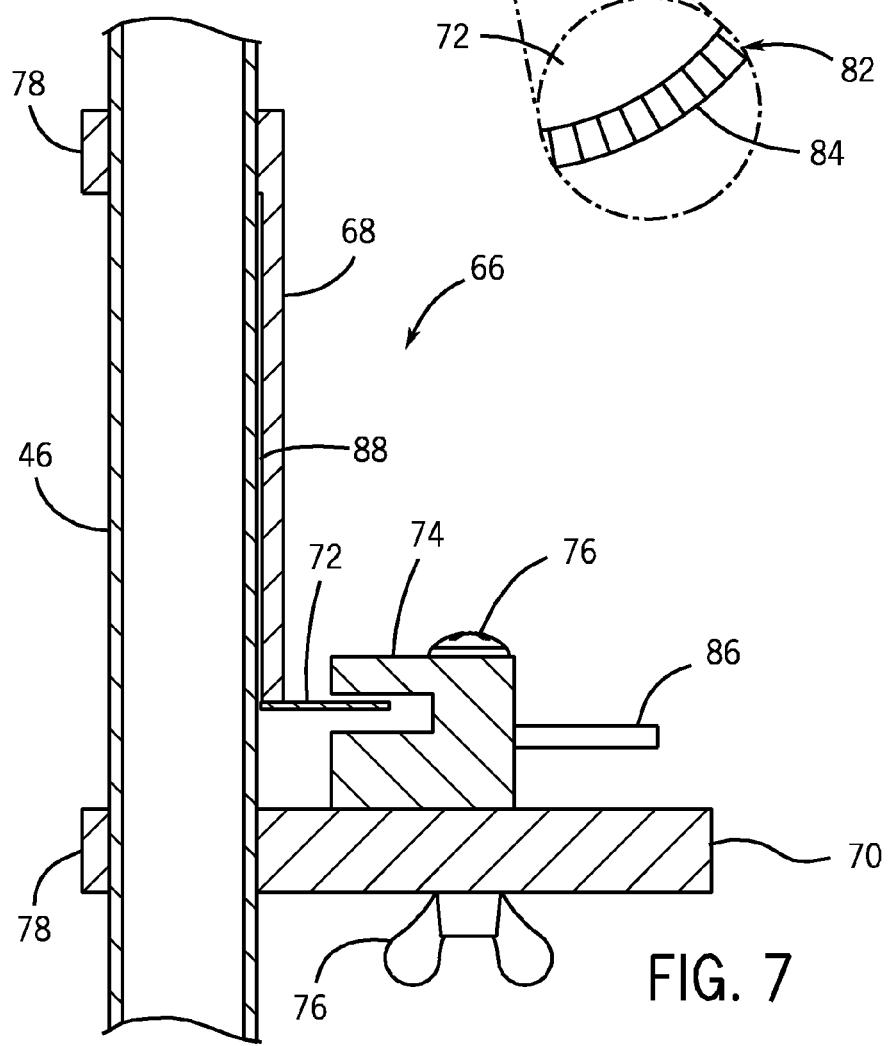

TORSION MEASUREMENT DEVICE

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in finding and extracting oil, natural gas, and other subterranean resources from the earth. Particularly, once a desired subterranean resource is discovered, drilling and production systems are often employed to access and extract the resource. These systems may be located onshore or offshore depending on the location of a desired resource.

Further, such systems generally include a wellhead assembly through which the resource is extracted. These wellhead assemblies may include a wide variety of components, such as various casings, valves, fluid conduits, and the like, that control drilling or extraction operations. Subsea wellhead assemblies often include control pods that operate components and manage flow through the assemblies. The control pods may route hydraulic fluid to and from valves of the assemblies via hydraulic control tubing, for instance. Such hydraulic control tubing may be subjected to various forces, including torsional stress, when coupled between the control pod and other components. If sufficiently high, the forces on the hydraulic control tubing may negatively impact performance of the tubing and control of the wellhead assembly.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to a torsion measurement device. In some embodiments, the torsion measurement device is attached to a hydraulic control tubing assembly to determine torsional stress on tubing of the assembly. The torsion measurement device of one embodiment includes an optical sensor and an angular encoder. Each of these components is attached to tubing to enable measurement of angular deflection of the optical sensor and the angular encoder with respect to one another in response to a change in torque applied to the tubing. The angular deflection is then used to determine the change in torsional stress on the tubing.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein:

FIG. 1 generally illustrates a system for extracting a resource (e.g., oil or natural gas) from a well in accordance with an embodiment of the present disclosure;

FIG. 2 illustrates various components of the stack equipment of FIG. 1 in accordance with one embodiment;

FIG. 6 is a top plan view of the torsion measurement tool and tube of FIG. 5;

FIG. 7 is a cross section of the torsion measurement tool and tube depicted in FIGS. 5 and 6;

DETAILED DESCRIPTION OF SPECIFIC EMBODIMENTS

Figure 3:
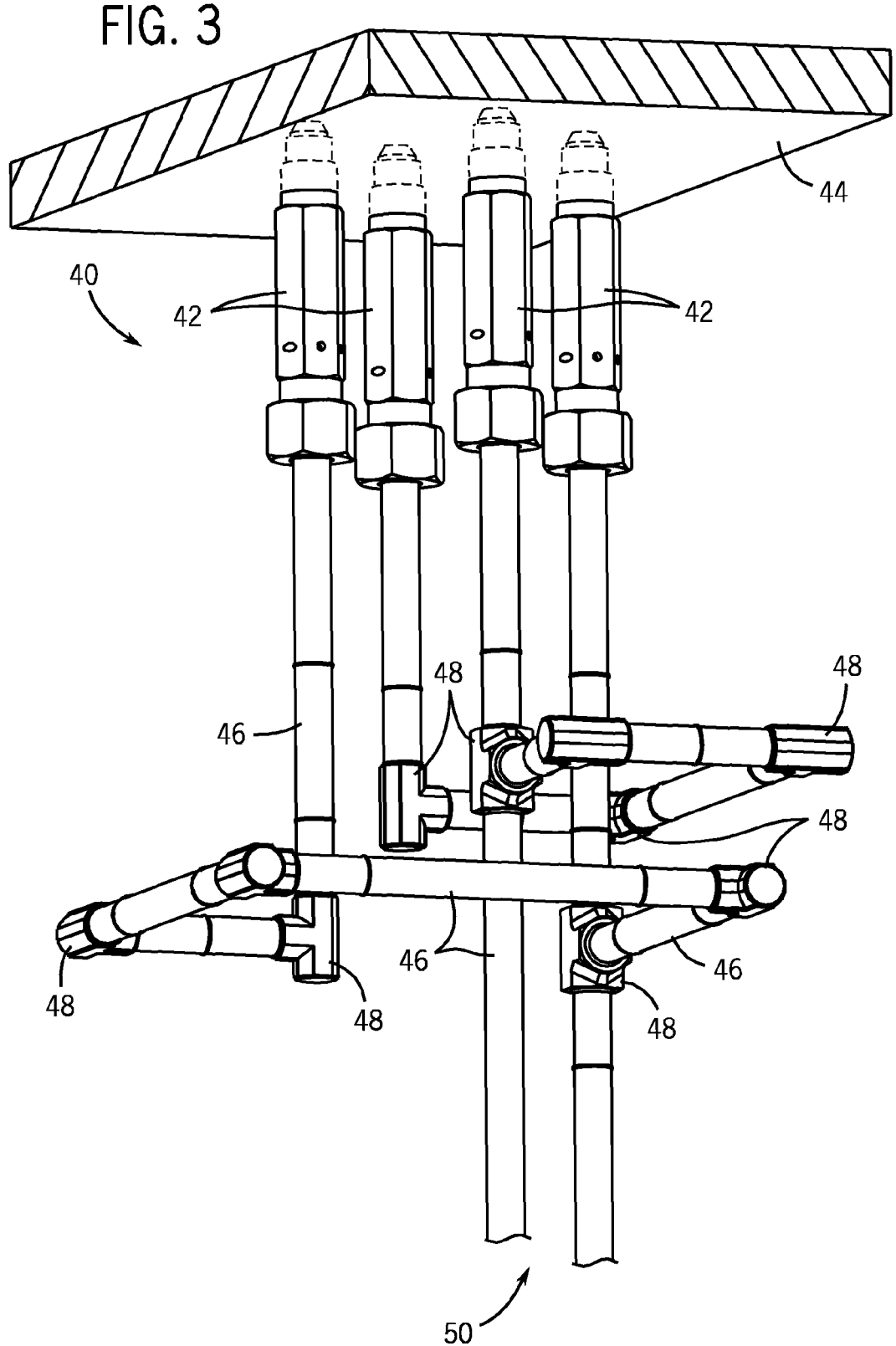
FIG. 3 depicts a portion of the control tubing of FIG. 2 having tubing joined with connectors and secured to a control pod base with hydraulic fittings in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Turning now to the present figures, a resource extraction system 10 is illustrated in FIG. 1 in accordance with one embodiment. Notably, the system 10 facilitates extraction of a resource, such as oil or natural gas, from a well 12. As depicted, the system 10 is a subsea system that includes surface equipment 14, riser equipment 16, and stack equipment 18, for extracting the resource from the well 12 via a wellhead 20. In one subsea resource extraction application, the surface equipment 14 is mounted to a drilling rig above the surface of the water, the stack equipment 18 is coupled to the wellhead 20 near the sea floor, and the surface equipment 14 and stack equipment 18 are coupled to one another via the riser equipment 16.

As will be appreciated, the surface equipment 14 may include a variety of devices and systems, such as pumps, power supplies, cable and hose reels, control units, a diverter, a gimbal, a spider, and the like. Similarly, the riser equipment 16 may also include a variety of components, such as riser joints, fill valves, control units, and a pressure-temperature transducer, to name but a few. The riser equipment 16 facilitates transmission of the extracted resource to the surface equipment 14 from the stack equipment 18 and the well 12. The stack equipment 18, in turn, may include a number of components, such as blowout preventers, production trees (also known as "Christmas" trees), and the like for extracting the desired resource from the wellhead 20 and transmitting it to the surface equipment 14 via the riser equipment 16.

In one embodiment generally depicted in FIG. 2, the stack equipment 18 includes a control pod 26 for controlling flow from the well 12. Particularly, the control pod 26 may be installed on a control pod base 28 that hydraulically connects the control pod 26 to one or more controlled components 32 via hydraulic control tubing 30. This allows the control pod 26 to control the application of hydraulic fluid to the one or more controlled components 32 (e.g., a choke, a blowout preventer, or another valve) to vary the flow through the stack equipment 18 from the well 12. In practice, stack equipment often includes multiple control pods for redundancy. Thus, it will be appreciated that some embodiments include multiple control pods 26 with their own associated bases 28 and control tubing 30.

A possible arrangement of a control pod base and hydraulic control tubing is depicted in FIG. 3 in accordance with one embodiment. The hydraulic control tubing assembly 40 includes fittings 42 that connect a control pod base 44 with a system of tubes 46 and connectors 48 (e.g., elbow connectors and T-connectors). In the depicted embodiment, the individual tubes 46 and connectors 48 are welded to one another such that the four fittings 42 are connected in pairs by the tubing. More specifically, the tubing includes four conduits extending from the fittings 42, with two of the conduits terminating in T-connections of the other two conduits. In such an embodiment, hydraulic fluid routed through multiple fittings 42 may be merged into a smaller number of conduits and supplied to one or more controlled components via an end 50 of the depicted tubing system. In one embodiment, the tubes 46 are ⅜-inch diameter pipes, but pipes of other diameters (e.g., ½-inch or ¾-inch) may be used in other assemblies 40.

Figure 4:
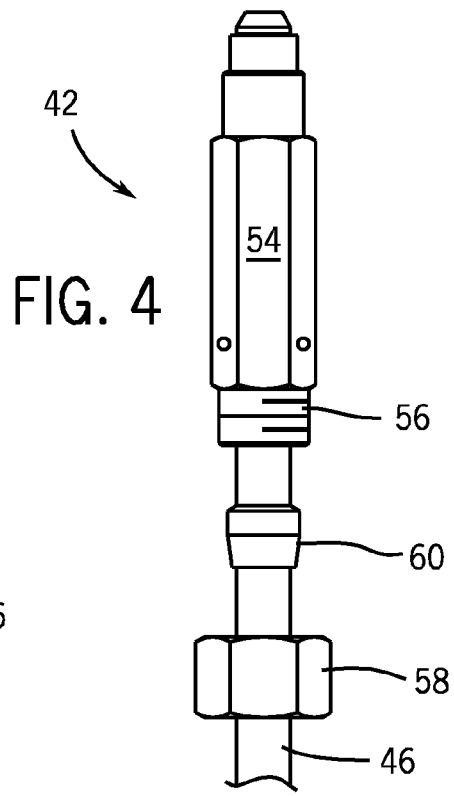
FIG. 4 is a detail view of a hydraulic fitting of FIG. 3 in accordance with one embodiment.

A fitting 42 is illustrated in FIG. 4 in greater detail, though it will be appreciated that fittings may differ from these details in other embodiments. The fitting 42 includes a main body 54 including a threaded shank 56. A gland nut 58 includes mating threads and may be tightened (via rotation) on the threaded shank 56 to retain a collet 60 against a tube 46 extending from the fitting 42.

In some conditions, tightening of the gland nuts 58 of the fittings 42 induces twisting forces (i.e., torsion) on the components of the tubing assembly 40. While the tubing assembly 40 may be formed with materials generally capable of withstanding shear stresses resulting from such twisting (e.g., with duplex stainless steel components), excessive levels of torsion may impair reliability or longevity of the tubing assembly 40. For instance, the tubing assembly 40 may not be significantly impacted by two foot-pounds of torsional stress resulting from tightening of a gland nut 58, but fifty foot-pounds of torsional stress from tightening the gland nut 58 may cause undesirable effects (e.g., cracking of welds between tubes 46 and connectors 48). As will be appreciated, the amount of torsion causing pernicious effects will vary depending on numerous factors, including the material of the components of the tubing assembly 40, the metallurgy of the welds between the components, and the geometry of the assembly 40.

But it can be difficult to detect torsion in assemblies like the tubing assembly 40. Particularly, angular deflection of tubing is difficult to observe visually. Torsion could be measured by electrical strain gauges, such as gauges adhered to the tubing in which changes in electrical resistivity of a metallic element of the gauge (e.g., foil) can be correlated to deformation of the gauge and stress on the tubing. But such strain gauges would be relatively expensive to apply and maintain over the life of a tubing assembly.

Figure 5:
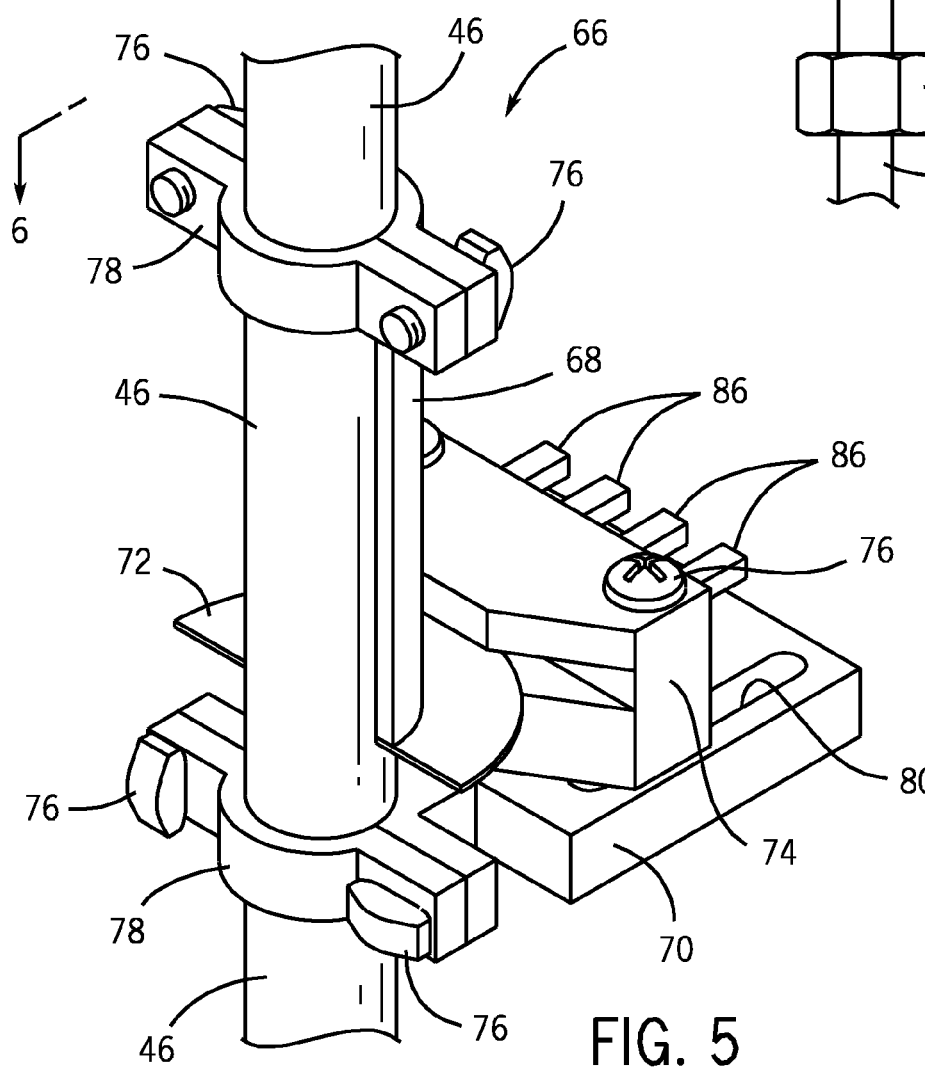
FIG. 5 is a perspective view of a torsion measurement tool attached to a tube of the control tubing of FIG. 3 in accordance with an embodiment of the present disclosure.

A different mechanism for measuring torsion in tubing (or in other elongate members) is depicted in FIGS. 5-7 in accordance with one embodiment. Particularly, these figures depict a mechanical torsion measurement gauge 66 (which may also be referred to as a device or tool) attached to a tube 46 of the tubing assembly 40. The gauge 66 includes a mechanical extension arm 68 and a base 70. The arm 68 generally extends along the tube 46 and is spaced apart from the tube 46 by a gap 88 (FIG. 7).

An angular encoder, which is a gauge component provided in the form of a portion 72 of a disk in FIGS. 5-7, is attached to the arm 68. In the presently depicted embodiment, the disk portion 72 is attached perpendicularly to the end of the arm 68 and is received by a slot in an optical sensor 74 attached to the base 70. The disk portion 72 may be adhered to the arm 68, may be held by a retainer ring, or may be otherwise attached to the arm 68 in any suitable manner. The optical sensor 74 measures relative rotation of the disk portion 72 within the slot resulting from a change in torque applied to the tube 46, and such measurement may be used to calculate the change in torque and torsion on the tube 46.

In some embodiments, the optical sensor 74 is a transmissive optical encoder module having a light-emitting diode and a detector integrated circuit enclosed in a polymer package, such as a module available from US Digital of Vancouver, Wash., with the model designation EM1. Also, the disk portion 72 may be formed from optical encoder disks, such as disks also available from US Digital (e.g., those designated EM1-1-400 or EM1-1-1250). The disk portion 72 may be split from a complete disk (or a portion thereof) to facilitate attachment of the disk portion 72 to the arm 68 while allowing rotation of the disk portion 72 about the tube 46. In one particular embodiment, the disk portion 72 is formed by splitting an optical encoder disk in half. The disk portion 72 and the optical sensor 74 may have any desired angular resolution, such as an incremental resolution of 0.23 degrees or 0.072 degrees. Suitable positioning of the disk portion 72 and the optical sensor 74 may depend on the characteristics of these components, and the gauge 66 may include various stoppers or other elements that aid in horizontally or vertically positioning the components with respect to one another. And while the disk portion 72 and optical sensor 74 are respectively coupled to the arm 68 and the base 70 in the present embodiment, other arrangements are also possible. For instance, the optical sensor 74 could be mounted on an arm and the disk portion 72 or other encoder could be mounted on a base.

The arm 68 and the base 70 may be attached to the tube 46 in any suitable fashion, such as with fasteners 76 (e.g., thumb screws) and clamps 78 as depicted in FIGS. 5-7. Additional fasteners 76 (e.g., screws and wing nuts) may be used to attach the optical sensor 74 to the base 70. The base 70 may include one or more attachment slots 80 that enable the optical sensor 74 to be moved toward or away from the arm 68, allowing adjustment of the relative position of the disk portion 72 and the optical sensor 74.

The attachment of the arm 68 and the base 70 at different positions along a tube 46 allow the optical sensor 74 to measure the difference between the amounts of rotation of the tube 46 at the attachment positions, with the disk portion 72 rotating about the tube 46 with the arm 68 and the optical sensor 74 rotating about the tube 46 with the base 70. Such angular deflection of the tube 46 between these two attachment positions may be used to calculate the applied torque in accordance with:

$$\theta = \frac{TL}{GJ}$$

or, expressed differently:

$$T = \frac{GJ}{L}\theta$$

in which θ is the angular deflection of the tube 46 in radians (as measured by the optical sensor 74), T is the torque applied to the tube 46, L is the length of the tube 46 over which the angular deflection was measured (e.g., the distance between the middle of clamp 78 of the arm 68 and the middle of clamp 78 of the base 70), G is the modulus of rigidity of the tube 46 (a physical characteristic of the material used for the tube 46), and J is the torsion constant for the tube 46 (a geometric characteristic of the tube 46). For an ideal tube with a wall of uniform thickness defined by inner and outer circumferences of constant diameters $D_i$ and $D_o$, respectively, the torsion constant is provided by:

$$J = \frac{\pi(D_o^4 - D_i^4)}{32}$$

Torsional stress (τ) at a given point of a tube is proportional to the radial distance (r) of that point from the axis of rotation and may be calculated in accordance with:

$$\tau = \frac{Tr}{J}$$

And as the torsional stress is proportional to the radial distance from the axis of rotation, the maximum torsional stress of the tube 46 may be calculated as:

$$\tau_{max} = \frac{16TD_o}{\pi(D_o^4 - D_i^4)}$$

As illustrated in FIG. 6, the disk portion 72 includes a series of graduated markings 82 on its surface that are readable by the optical sensor 74 as the disk portion 72 rotates in response to changes in torque on the tube 46. Although the markings 82 are shown as radially spaced markings near a circumferential edge 84 on an upper side (i.e., the side facing away from the base 70) of the disk portion 72 in FIG. 6, it is noted that the markings may be provided in a different form or at a different location that also allows reading by an optical sensor. For instance, while the markings 82 may extend around a substantial portion of the edge 84 in some embodiments, in other embodiments the markings 82 may be provided along only a small portion of the edge 84 expected to be read by the sensor 74. Or in other embodiments different markings 82 could instead be provided on a lower side (i.e., a side facing the base 70) of the disk portion 72. In one embodiment the optical sensor 74 reads the markings by detecting the number of markings passing by a detector of the optical sensor during rotation of the disk portion 72, which may be translated to angular deflection based on the incremental resolution of the disk portion 72.

The optical sensor 74, as depicted, also includes electrical pins or connections 86 to facilitate communication of data between the optical sensor 74 and another device. For instance, in one embodiment measurement of rotation obtained by the optical sensor 74 is communicated from the pins 86 to a computer via a USB cable and a suitable (e.g., output pins-to-USB) adapter. The computer is programmed with executable software that enables the computer to use the rotational measurement and other data (e.g., distance between attachment points on the tube 46, modulus of rigidity and torsion constant of the tube 46, and the inner and outer diameters of the tube 46) to calculate the torque and the torsional stress on the tube 46.

Figure 8:
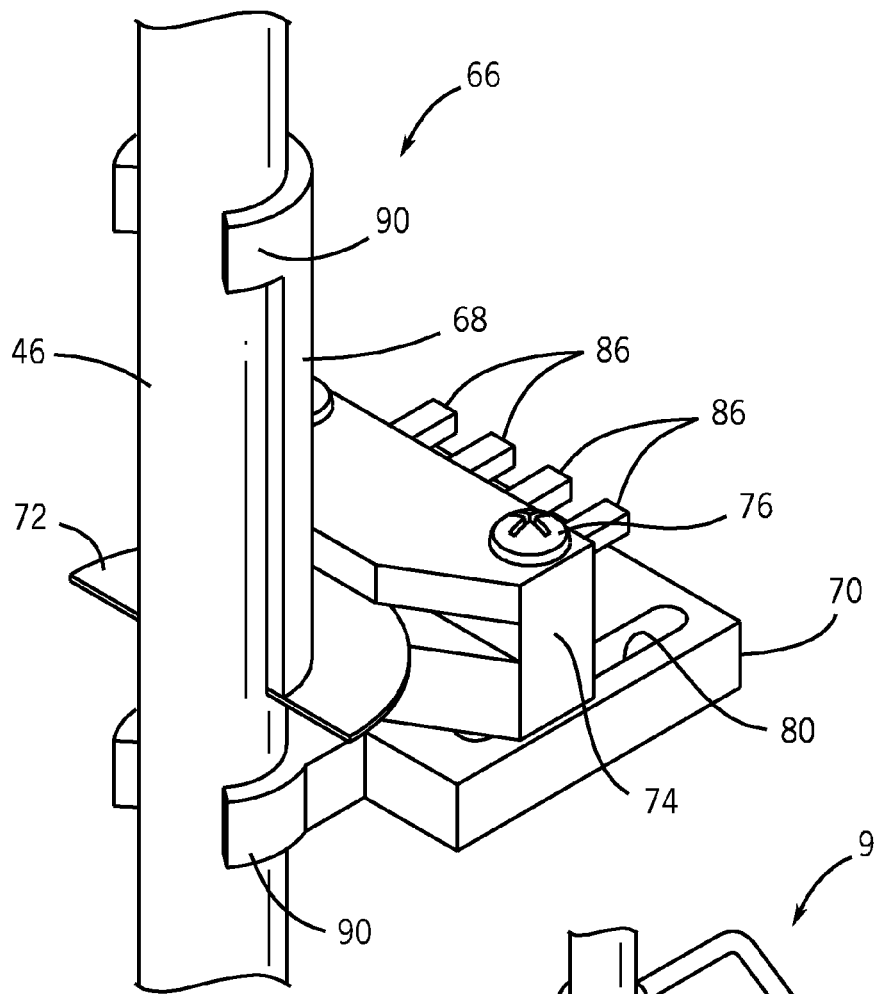
FIG. 8 depicts a torsion measurement tool with deformable clips for attaching to tubing in accordance with one embodiment of the present disclosure.

As noted above, the arm 68 and the base 70 of the gauge 66 may be attached to the tube 46 in any desirable manner. Rather than using clamps 78 as in FIGS. 5-7, the gauge 66 of another embodiment depicted in FIG. 8 instead includes deformable clips 90 that allow the gauge 66 to be more easily attached and removed from the tube 46. In still other embodiments, alligator clips, other spring clips, or other methods of attachment may be used.

Once the gauge 66 is attached to a tube 46 of the tubing assembly 40, the gauge 66 may be used to measure a change in torsional stress on the tube 46, such as a change in stress caused by adjusting a fitting 42 of the assembly 40. Particularly, the gauge 66 may be attached to the tube 46 before it is loaded by torque from the tightening of the fitting 42, in which case the gauge 66 may be used to measure angular deflection and calculate the increase in torsional stress from subsequent loading caused by tightening the fitting 42. Or the gauge 66 may be attached to the tube 46 after it is loaded with torque from tightening of the fitting 42, with the gauge 66 then able to measure angular deflection and calculate the decrease in torsional stress from subsequent unloading caused by loosening of the fitting 42. Whether measuring change in stress from an unloaded state to a loaded state or vice versa, the magnitude of the measured change can be used to verify that the stress is within desired operational limits. Once desired measurements of angular deflection by the gauge 66 have been taken, the gauge 66 may be easily removed from the tube 46 and saved for further use.

Figure 9:
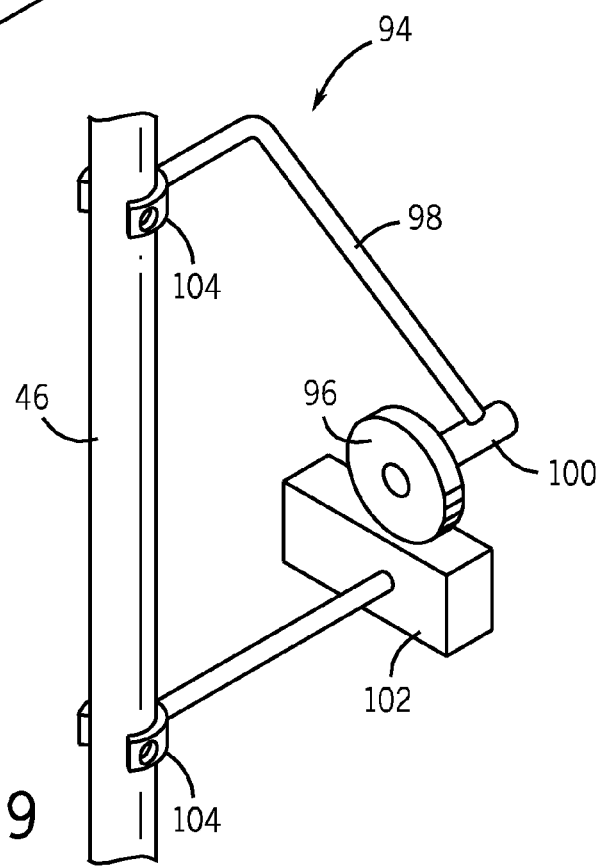
FIG. 9 is a perspective view of another torsion measurement tool in accordance with one embodiment.

In still other embodiments, mechanical gauges without an optical sensor may be used to measure angular deflection and facilitate calculation of torque and torsional stress on a tube 46 or other elongate member. For instance, in one embodiment depicted in FIG. 9 a mechanical gauge 94 includes a dial 96 coupled to an arm 98 via an axle 100. Angular deflection of the tube 46 causes the dial 96 to rotate along the base 102 and markings on one or both of the dial 96 and the base 102 may be used to determine the amount of angular deflection, as well as changes in torque and torsional stress on the tube 46 in a manner similar to that described above with respect to FIGS. 5-7. The arm 98 and the base 102 may be attached to different places on the tube 46 in any suitable manner, such as with clips 104 (as depicted in FIG. 9) or with clamps to allow simple attachment and removal of the gauge 94. In still other embodiments, a gear-driven dial, a vernier scale, or a digital linear displacement measurement device (such as that used on digital dial calipers) may also or instead be used to facilitate measurement of the angular deflection of a pipe 46.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system comprising:
   an arm connected to a hydraulic control tube at a first position;
   a base connected to the hydraulic control tube at a second position spaced a distance apart from the first position such that a change in torsional stress on the hydraulic control tube causes the arm and the base to rotate about an axis of the hydraulic control tube by different amounts and wherein the arm and the base are configured to enable measurement of the torsional stress on the hydraulic control tube through measurement of the difference in rotations of the arm and the base; and
   a control pod base coupled to the hydraulic control tube and configured to receive a control pod to enable fluid to flow between the control pod and one or more controlled components of subsea flow control equipment via the hydraulic control tube.

2. The system of claim 1, comprising a dial that enables measurement of the difference in rotations of the arm and the base.

3. The system of claim 2, wherein the dial is coupled to the arm and is configured to be driven along the base in response to a change in torsional stress on the hydraulic control tube to facilitate measurement of the change in torsional stress on the hydraulic control tube.

4. The system of claim 1, comprising an optical sensor and a marked surface configured to be read by the optical sensor.

5. The system of claim 4, wherein the optical sensor is coupled to the base and the marked surface is positioned by the arm to enable reading of the marked surface by the optical sensor.

6. The system of claim 4, wherein the optical sensor is coupled to the arm and the marked surface is positioned by the base to enable reading of the marked surface by the optical sensor.

7. A method for measuring torsional stress on tubing, the method comprising:
   coupling a torsion measurement device to hydraulic control tubing of a blowout preventer;
   adjusting a fitting coupled to the hydraulic control tubing to change an amount of torsional stress on the hydraulic control tubing;
   measuring the change in the amount of torsional stress on the hydraulic control tubing; and
   removing the torsion measurement device from the hydraulic control tubing.

8. The method of claim 7, wherein coupling the torsion measurement device to hydraulic control tubing includes coupling different members of the torsion measurement device to different portions of the hydraulic control tubing.

9. The method of claim 8, wherein coupling different members of the torsion measurement device to different portions of the hydraulic control tubing includes coupling an optical sensor to a first portion of the hydraulic control tubing and coupling an arm including an angular encoder to a second portion of the hydraulic control tubing such that the angular encoder may be read by the optical sensor.

10. The method of claim 7, wherein adjusting the fitting coupled to the hydraulic control tubing includes loosening the fitting to reduce torsional stress in the hydraulic control tubing.

11. The method of claim 7, wherein coupling the torsion measurement device includes clamping or clipping the torsion measurement device to the hydraulic control tubing.

12. A system comprising:
   an arm connected to a tube at a first position;
   a base connected to the tube at a second position spaced a distance apart from the first position such that a change in torsional stress on the tube causes the arm and the base to rotate about an axis of the tube by different amounts and wherein the arm and the base are configured to enable measurement of the torsional stress on the tube through measurement of the difference in rotations of the arm and the base; and
   an optical sensor and a marked surface configured to be read by the optical sensor, wherein the optical sensor is coupled to the base and the marked surface is positioned by the arm to enable reading of the marked surface by the optical sensor.

13. A method for measuring torsional stress on tubing, the method comprising:
   coupling a torsion measurement device to hydraulic control tubing of wellhead stack equipment;
   adjusting a fitting coupled to the hydraulic control tubing to change an amount of torsional stress on the hydraulic control tubing;
   measuring the change in the amount of torsional stress on the hydraulic control tubing; and
   removing the torsion measurement device from the hydraulic control tubing.

14. The method of claim 13, wherein coupling the torsion measurement device to hydraulic control tubing includes coupling different members of the torsion measurement device to different portions of the hydraulic control tubing.

15. The method of claim 14, wherein coupling different members of the torsion measurement device to different portions of the hydraulic control tubing includes coupling an optical sensor to a first portion of the hydraulic control tubing and coupling an arm including an angular encoder to a second portion of the hydraulic control tubing such that the angular encoder may be read by the optical sensor.

16. The method of claim 13, wherein adjusting the fitting coupled to the hydraulic control tubing includes loosening the fitting to reduce torsional stress in the hydraulic control tubing.

17. The method of claim 13, wherein coupling the torsion measurement device includes clamping or clipping the torsion measurement device to the hydraulic control tubing.

* * * * *